May 21, 1968  R. M. LOOMIS ET AL  3,384,034
LADING SEPARATOR FOR RAILROAD CARS
Filed Aug. 15, 1966  6 Sheets-Sheet 3
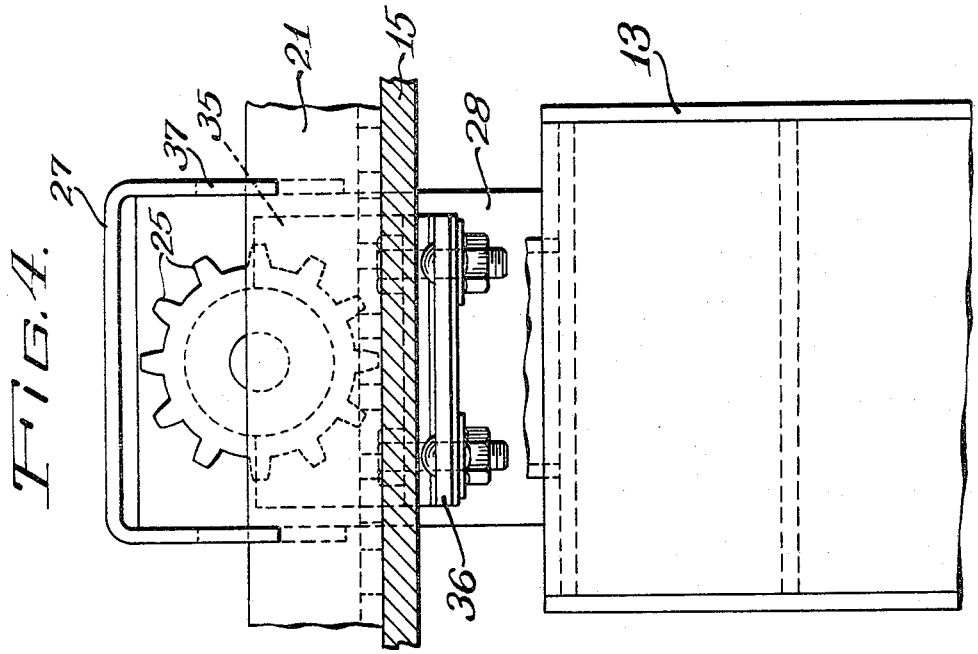
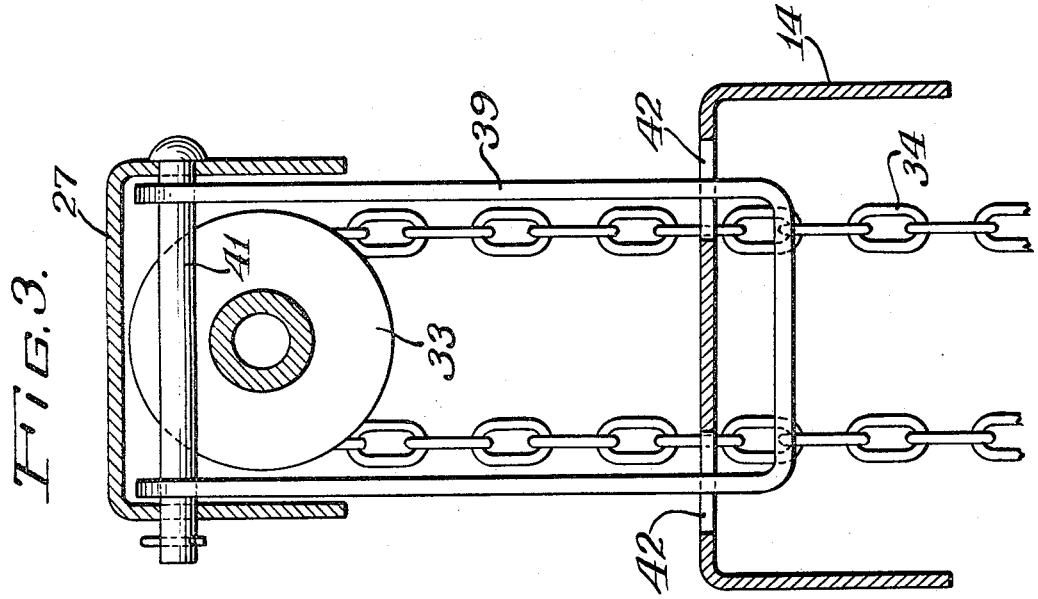
Inventors:
Russell M. Loomis
Leslie W. Martin
By Hair Freeman & Molinare
Attys.

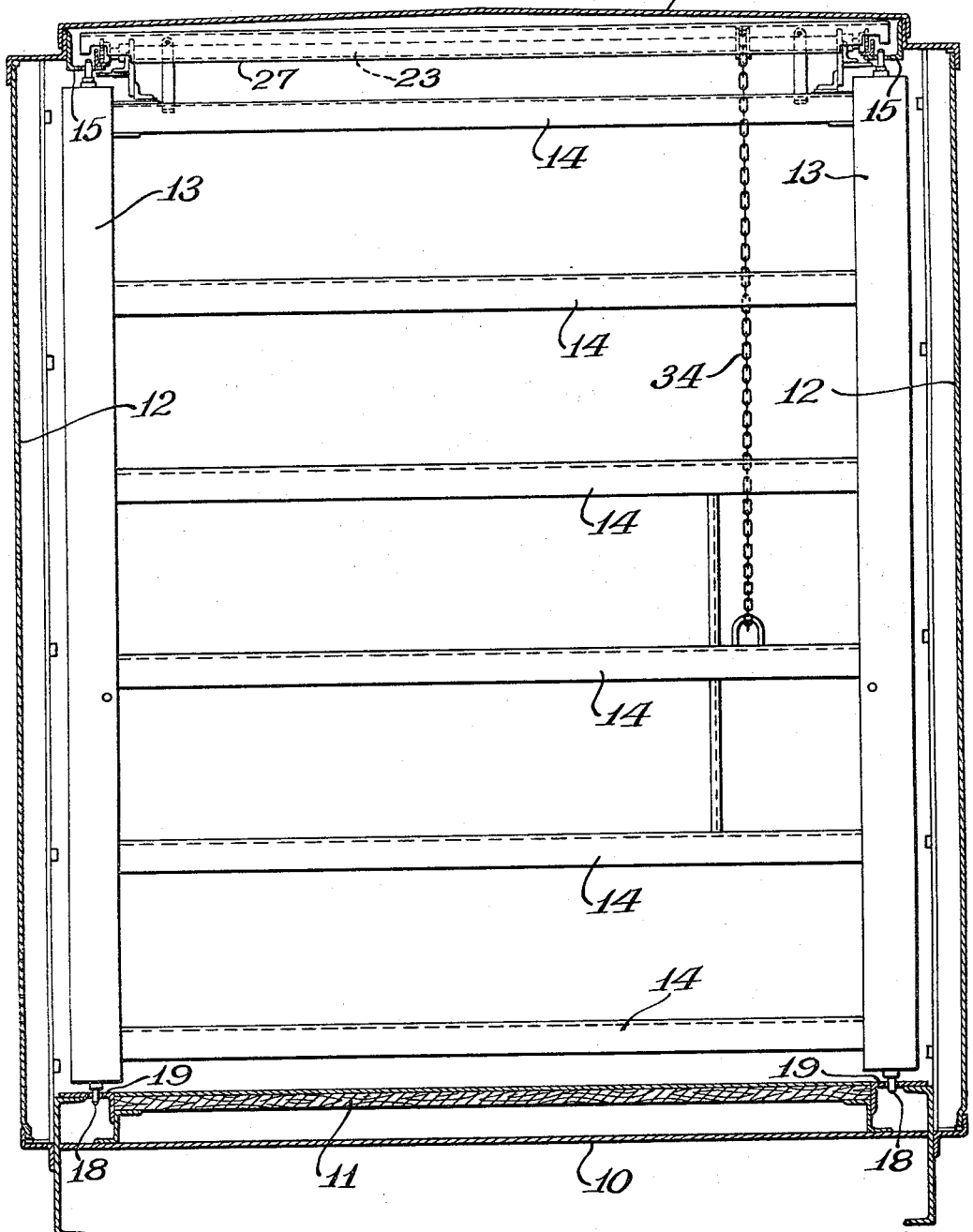

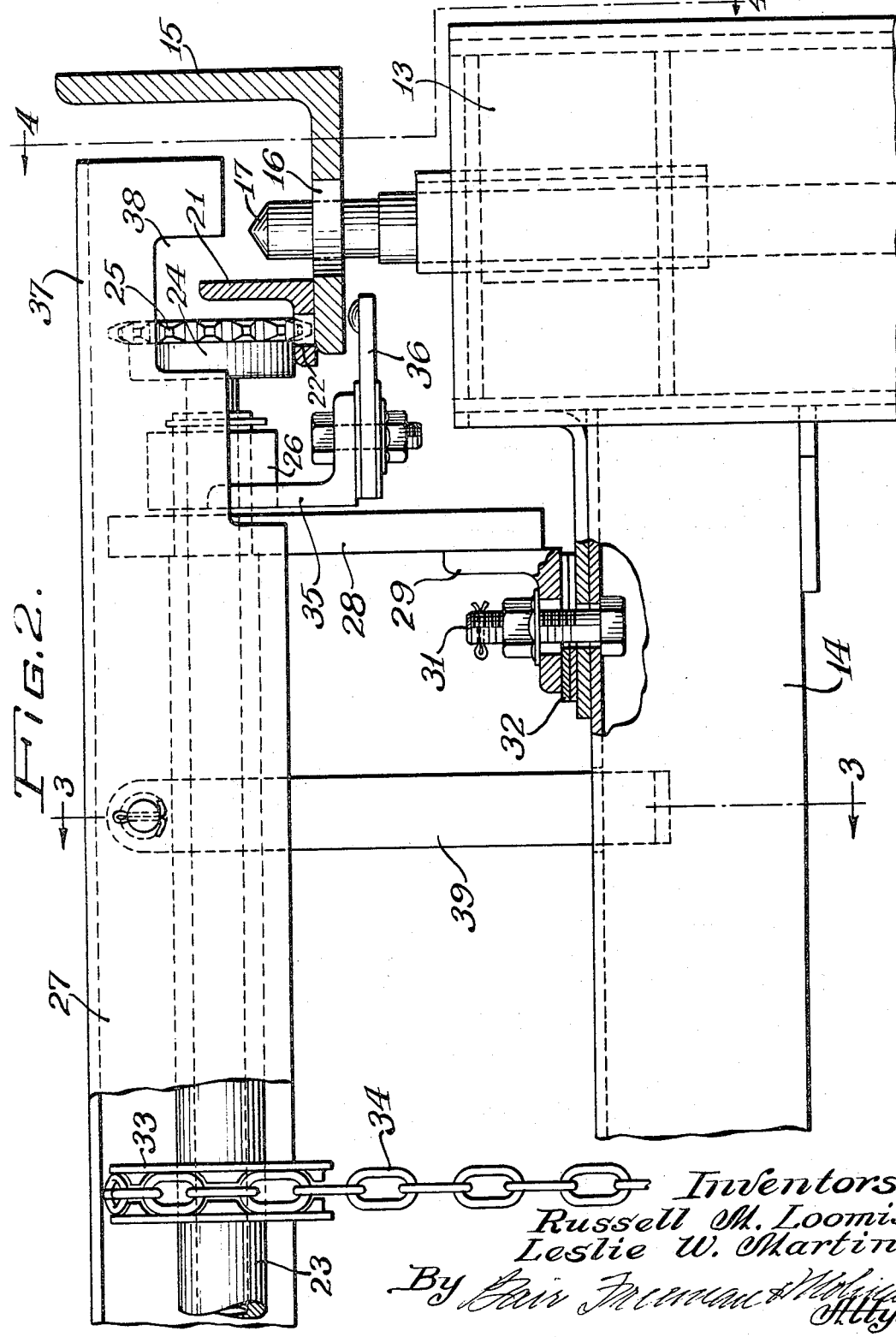

May 21, 1968  R. M. LOOMIS ET AL  3,384,034
LADING SEPARATOR FOR RAILROAD CARS
Filed Aug. 15, 1966  6 Sheets-Sheet 4

Inventors:
Russell M. Loomis
Leslie W. Martin
By Bair, Freeman + McIlvaine
Attys.

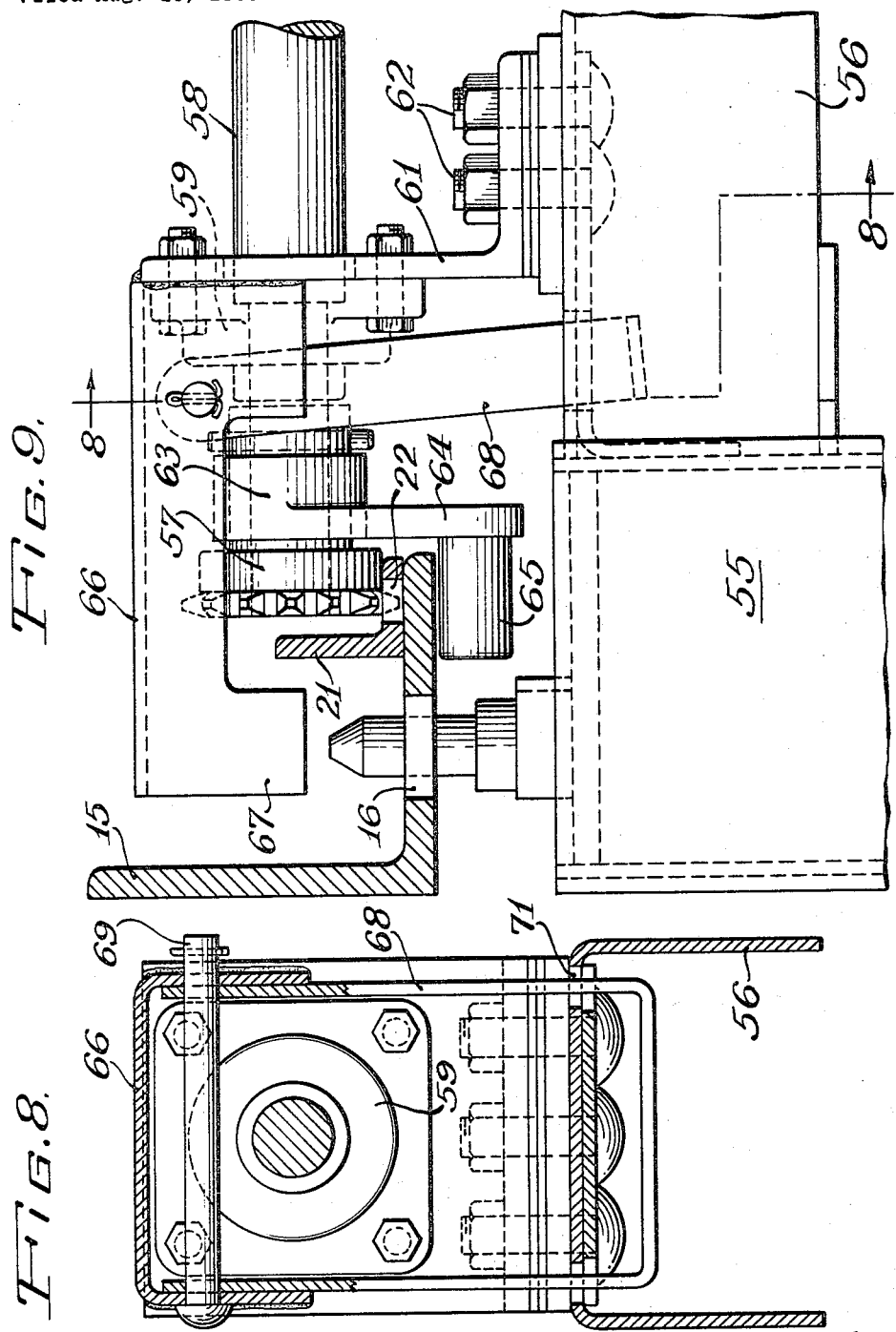

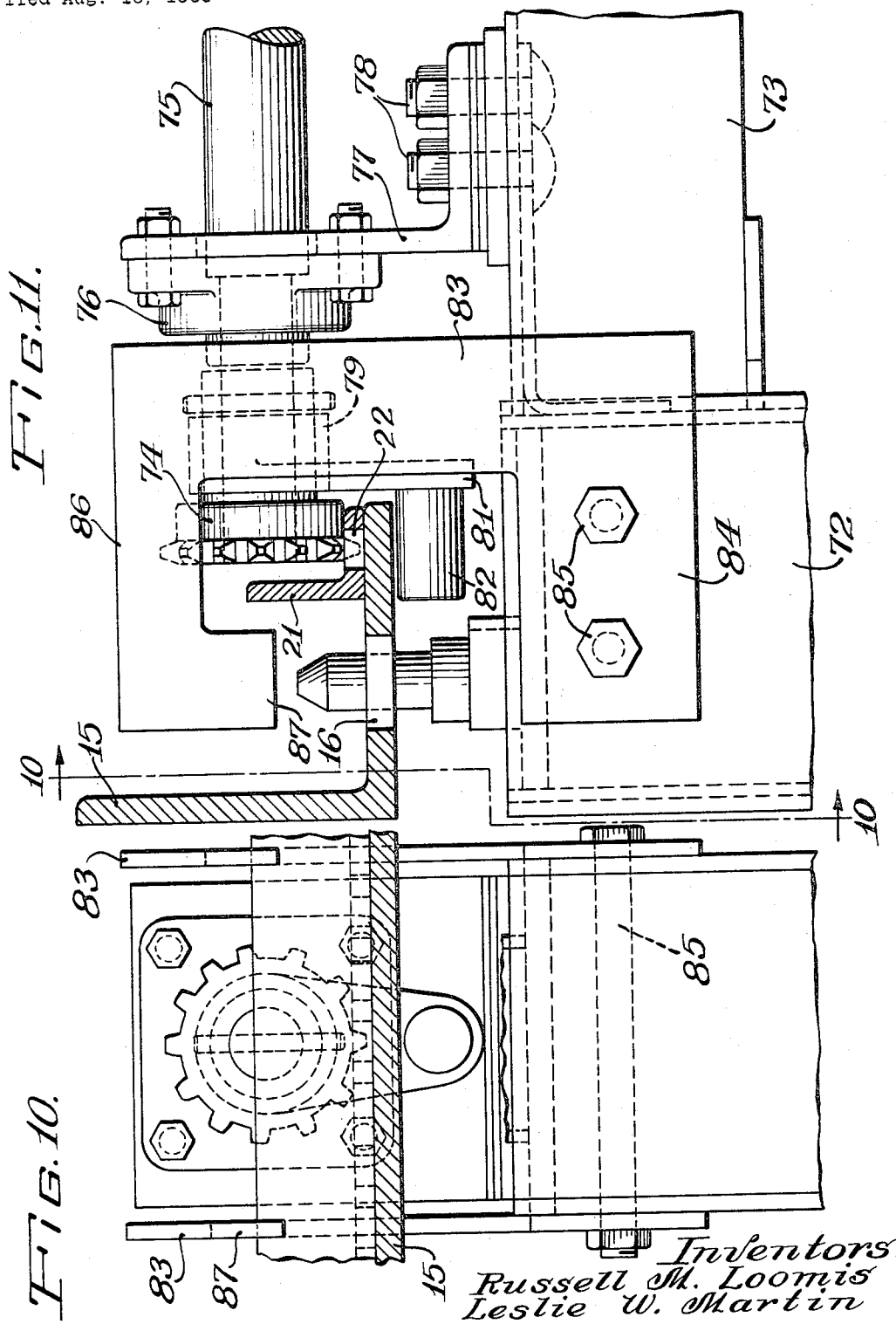

United States Patent Office 3,384,034
Patented May 21, 1968

3,384,034
LADING SEPARATOR FOR RAILROAD CARS
Russell M. Loomis, Palos Heights, and Leslie W. Martin, Chicago, Ill., assignors to Unarco Industries, Inc., a corporation of Illinois
Filed Aug. 15, 1966, Ser. No. 572,475
2 Claims. (Cl. 105—376)

ABSTRACT OF THE DISCLOSURE

In a lading separator of the type that includes a bulkhead supported by support means that are arranged to roll over spaced tracks, there is provided an improvement of extensions which project outwardly beyond the roller members and the tracks and are arranged to engage and hold the bulkhead from falling in the event the rollers should slip from the tracks. The tracks are particularly provided with upwardly extending members outwardly of the tracks and the extensions have downwardly projecting parts located outwardly of the upright parallel members so as to insure against failure of the safety feature. Additional safety means are provided between the support means for the bulkhead and the bulkhead, to prevent the bulkhead from falling if the connection between the support means and the bulkhead should inadvertently fail. The safety means between the support means and the bulkhead provides for freedom of movement by the bulkhead so as to permit of adjustment of the height of the bulkhead relative to the support means.

---

This invention relates to a lading separator for railroad cars or the like and more particularly to safety means to prevent falling of the bulkhead in the event the rollers which normally support it should become disengaged from the tracks on which they normally ride or in the event the connection between the bulkhead and the rollers should be broken.

In separating lading in railroad cars and the like it is common practice to use bulkheads which are supported on tracks at the sides of the car for movement to different positions longitudinally of the car. One such construction which is particularly adapted for use in large cars, so-called high cube cars, wherein the safety problem becomes acute is more particularly described and claimed in Patent No. 3,168,055.

Even though it is customary in devices of this kind to provide a bracket extending beneath the tracks to prevent the rollers from leaving the tracks, it has been found on occasion that such brackets are improperly adjusted and that the rollers can and do leave the tracks. Even when the brackets are properly adjusted it has been found that a severe shock, such as sometimes occurs in switching, can disengage the rollers from the track.

It is accordingly an object of the present invention to provide a lading separator which incorporates safety means to support the bulkhead from the tracks in the event the rollers disengage the tracks.

According to a feature of the invention an extension is provided on the supporting structure for the roller shaft or which may be directly connected to the bulkhead itself and which extends over the tracks to catch on the tracks and support the bulkhead in the event the roller leaves the tracks.

A further object is to provide a lading separator including a linkage connecting the bulkhead to the supporting structure for the roller shaft to support the bulkhead in the event the normal connection between it and the supporting structure should fail.

The above and other objects and features of the invention will be more readily apparent from the following description when read in connection with the accompanying drawings in which:

FIG. 1 is a section through a railroad car equipped with a lading separator embodying the invention;

FIG. 2 is a partial transverse section with parts in elevation of the construction shown in FIG. 1;

Figure 5:
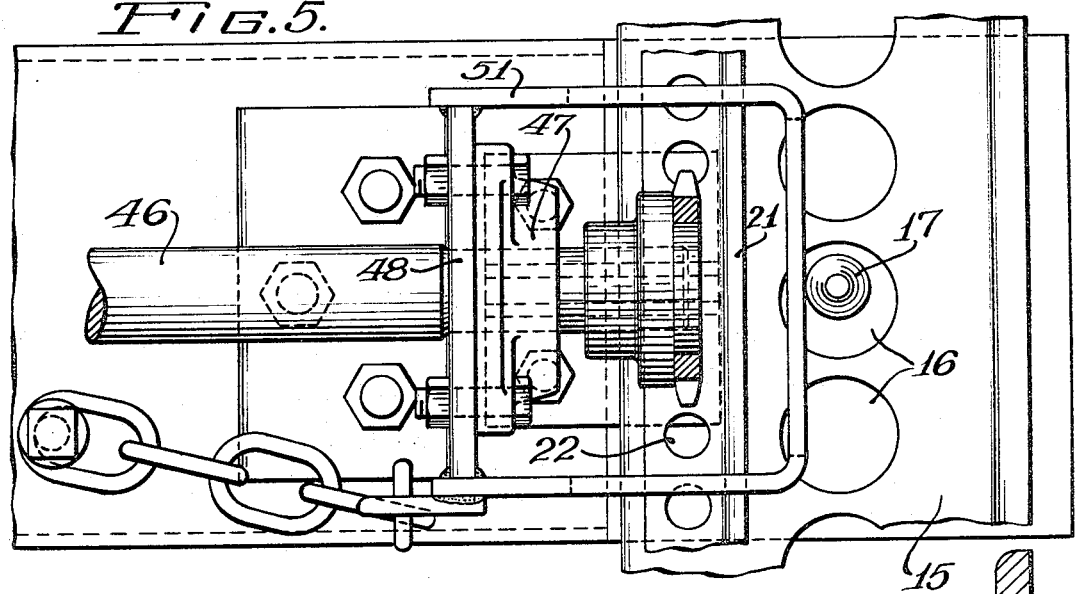
Figure 6:
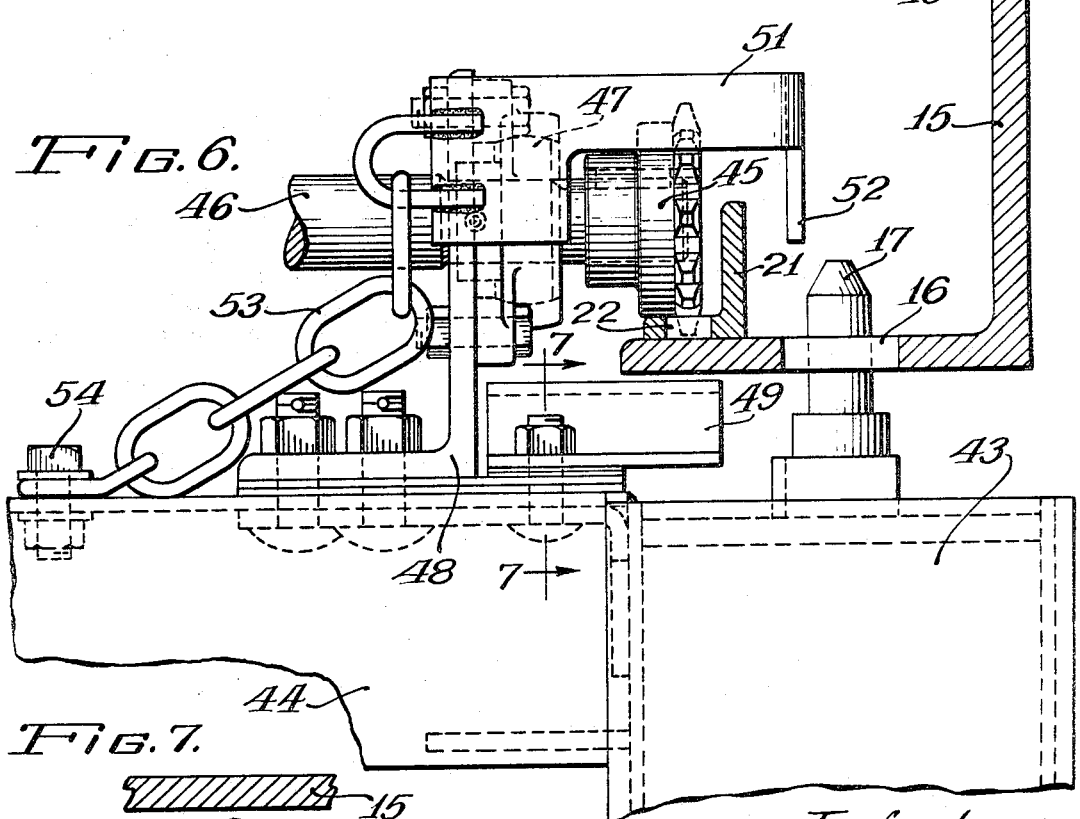
Figure 7:
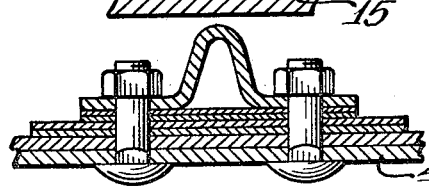

FIGS. 3 and 4 are partial sections taken on the lines 3—3 and 4—4, respectively, of FIG. 2;

FIG. 5 is a partial top plan view showing an alternative construction;

FIG. 6 is a transverse section with parts in elevation of the construction shown in FIG. 5;

FIG. 7 is a partial section on the line 7—7 of FIG. 6;

FIG. 8 is a partial section of another alternative construction taken on the line 8—8 of FIG. 9;

FIG. 9 is a transverse section with parts in elevation of the construction of FIG. 8;

FIG. 10 is a partial section through still another construction embodying the invention taken on the line 10—10 of FIG. 11; and FIG. 11 is a transverse section with parts in elevation of the construction shown in FIG. 10.

Referring first to FIG. 1 there is shown therein in transverse section a typical railroad car construction comprising a sub-floor 10 above which a lading supporting floor 11 is mounted. Side walls 12 extend upwardly from the floor and are connected by a roof structure indicated at 13. It will be understood, of course, that the car is supported on the usual trucks for movement over tracks and is provided with doors in its sides through which lading may be loaded or removed in the usual manner.

The lading in the car is adapted to be separated by a bulkhead formed of vertical side posts 13 connected at vertically spaced intervals by cross bars 14. The side posts 13 are preferably of hollow box section and the cross bars 14 may be inverted metal channels secured to the side posts by welding or other suitable permanent fastening means.

The bulkhead is supported in the car for movement lengthwise thereof for which purpose the car is provided adjacent to the juncture of its side walls and roof with tracks 15. As best seen in FIG. 2 each of the tracks 15 is formed of an angle strip having a vertical flange secured in the car and a horizontal flange projecting inwardly from the car side wall. Each horizontal flange is formed with a series of latching openings 16 to receive latch pins 17 mounted in the side posts 13 and controllable through suitable latch operating mechanism, not shown, to be either retracted so that the bulkhead can be moved or extended to engage in the latching openings 16. The operating mechanism may be as more particularly disclosed and claimed in Patent No. 3,168,055. Similar latch pins 18 may extend from the lower ends of the side posts 13 to enter openings in latching strips 19 secured in the car adjacent to the juncture of the side walls and floor thereof. Each of the tracks 15 carries near the inner edge of its horizontal flange an angle strip 21 one of whose flanges extends vertically and the other of whose flanges overlies the horizontal flange of the strip 15 and extends toward the interior of the car. The horizontal flange of strip 21 is formed with a series of closely spaced openings 22 to receive and cooperate with guide sprockets as described more fully hereinafter.

A shaft 23 extends transversely of the car above the bulkhead and at its ends is connected to rollers indicated generally at 24. The shaft 23 may be formed with one or more telescopically interfitting sections so that the spacing between the rollers can vary to accommodate any slight differences in the space between the tracks lengthwise of the car. Each roller 24 is formed with a smooth section which rides on the inner edge of the horizontal flange of the strip 21 and with an adjacent section formed with projecting teeth 25 which will enter and cooperate with the openings 22 in the flange.

The shaft 23 is journaled in two or more bearings mounted in plates 28 which is secured to a cross beam 27 which may be in the form of an inverted channel. The bulkhead is suspended from the cross beam by the plates 28 adjacent to each end of the cross beam and which have angle strips 29 permanently secured to their lower ends. The horizontal flanges of the angle strips 29 are formed with openings to receive fastening bolts 31 which extend through openings in the top of the upper cross member 14 of the bulkhead. Shims as shown at 32 may be placed between the upper surface of the bulkhead cross member and the horizontal flange of the angle strip 29 to level the bulkhead properly in the car.

The cross shaft 23 carries a sprocket wheel 33 over which a fall chain 34 is trained. As seen in FIG. 1 the chain 34 extends to a point centrally of the height of the bulkhead at which it can easily be reached by a man standing in the car to manipulate it. By this means the bulkhead which is relatively large and heavy can be moved easily lengthwise in the car by pulling on the chain to turn the shaft 23 thereby to turn the sprocket wheels and cause them to roll along the tracks.

After the cross beam 27 and the shaft are assembled in the car a hold-down bracket is preferably connected to hold the sprocket teeth properly in position with respect to the openings 22 in the track. As shown this bracket comprises an angle strip 35 secured to bearings 26 rotatable on the shaft 23 adjacent to each end thereof. A plate 36 is secured to the horizontal flange of the angle strip and extends beneath the horizontal flange of the angle strip 15 as best seen in FIGS. 2 and 4. The position of the plate 36 vertically can be adjusted by the use of shims so that its outer end portion will lie closely adjacent to the under side of the horizontal flange on strip 15. Thus this plate will tend to hold the sprocket down on the track to insure proper movement of the bulkhead in the car and to prevent accidental removal of the rollers from the track.

Despite the provision of the hold-down bracket and plate it has been found that at times the rollers will leave the track and allow the bulkhead to fall. According to the present invention, safety means are provided to prevent falling of the bulkhead even in the event that the rollers should jump the track for any reason. As shown in FIGS. 1, 2 and 4 this means comprises an extension 37 on each end of the cross beam 27 which extends outwardly beyond the vertical flange of the angle strip 21. Preferably the extension is cut out as indicated at 38 at a point closely spaced from its end to span the vertical flange of the angle strip 21.

With this construction if either or both of the rollers should leave the track for any reason the entire bulkhead structure will tend to fall. However, after only a very short fall the extension or extensions 37 at the ends of the cross beam will engage the vertical flanges of the strips 21 so that the bulkhead will be held in an upright position in the car. In this way damage to the bulkhead itself or to the lading in the car due to falling of the bulkhead will be prevented.

In order similarly to prevent falling of the bulkhead in the event of failure of the connections between the bulkhead and the cross beam, a safety hanger is provided. As best seen in FIGS. 2 and 3 this safety hanger is in the form of a U-shaped strap 39. The upper ends of the legs of the strap 39 extend into the channel shaped cross beam 27 and are secured therein on a pin 41 extending across the cross beam. The lower ends of the hanger 39 extend through openings 42 in the top of the upper cross member 14 of the bulkhead with the base of the U-shaped member lying within the cross member 14 of the bulkhead.

With this construction if there should be a failure of the bolts 31 or of any other part of the structure by which the bulkhead is suspended on the cross beam, the bulkhead will be permitted to drop through only a very short distance before it is caught by the hanger and held in upright position.

The alternative construction as shown in FIGS. 5 and 6 involves the same track structure as shown in FIGS. 1–4 and the parts thereof are indicated by the same reference numerals. In this construction the bulkhead comprises box section side posts 43 joined at the top and at spaced levels below the top by channel shaped cross members 44. Rollers 45 which are similar to the rollers described in connection with FIGS. 1–4 are mounted on a cross shaft 46. In this construction, however, there is no cross beam and the bulkhead is directly suspended from bearings 47 in which the shaft 46 is rotatable. As shown, the bearings 47 are bolted to the vertical flange of an angle strip 48 whose horizontal flange overlies and is bolted to the upper surface of the cross member 44. Shims may be placed between the horizontal flange of the strip 48 and the cross member 44 to level and position the bulkhead in the car.

The rollers 45 are normally maintained in the desired engagement with the tracks by brackets 49 which may be generally of inverted V shape as shown best in FIG. 7. Flat side flanges on these brackets are secured by bolts as shown to the upper wall of the top cross member 44 of the bulkhead with shims being inserted as necessary.

In this construction the extension 37 as shown in FIGS. 1–4 is replaced by a U-shaped bracket 51, the ends of whose legs straddle and are secured as by welding to sides of the vertical flange of the angle strip 48. The bracket 51 extends over the top of the vertical flange of the angle strip 21 on the track and is provided with a downward extension 52 beyond the strip 21 and extending below the top thereof as best seen in FIG. 6. This construction will function in the same way as the extension 37 of FIGS. 1–4 to prevent the bulkhead from falling in the car in the event one or both of the rollers should disengage its track.

To prevent falling of the bulkhead in the event the connection between it and the bearing should fail, a safety linkage shown as a chain 53 is provided. One end of the chain is secured to the supporting structure as by welding it to the outside of the bracket 51 in registration with the vertical flange of the angle strip 48 as shown. The other end of the chain linkage 53 is secured to the top of the upper cross member 44 of the bulkhead as by means of a bolt 54. Thus in the event of failure of the connections between the bearings and the bulkhead the bulkhead will drop through only a very short distance before the chain 53 catches the bulkhead and prevents any further falling thereof.

The construction shown in FIGS. 8 and 9 utilizes the same track as in the previous figures and portions thereof are indicated by the same reference numerals as in the previous figures. In this construction the bulkhead is formed of box section side posts 55 connected by one or more cross members 56 which may be in the form of inverted channel shaped sections. Rollers 57 similar to the rollers heretofore described are carried by a cross shaft 58 to ride on the tracks. Bearings 59 journal the shaft adjacent to its opposite ends and are securely bolted to the vertical flange of an angle strip 61. The horizontal flange of the angle strip overlies and is secured to the top cross member 56 of the bulkhead by bolts 62 or similar fastenings. If desired, shims may be inserted between the horizontal flange of the strip 61 and the bulkhead to level and position it.

A hold-down means is provided normally to hold the rollers in engagement with the track which, as shown, comprises a bearing 63 in which the shaft is journaled closely adjacent to the roller and which has an arm 64 extending downwardly therefrom. The arm carries a pin or roller 65 which extends under the horizontal flange of the track member 15 and which under normal conditions will prevent the roller from leaving the track.

To support the bulkhead in the event the rollers should leave the tracks an inverted channel shaped strip 66 is secured as by welding to the vertical flange of the angle strip 61. The strip 66 extends over the top of the angle strip 21 and is provided with downwardly extending side flanges 67 which project below the level of the top of the strip 21. Thus in the event one or both of the rollers should leave its track, the strip 66 will engage the top of the angle strip 21 and will hold the bulkhead against falling through an excessive amount.

In the event the connection between the bulkhead and the bearing should fail, a safety hanger 68 similar to the hanger 39 of FIGS. 1–4 is provided. This hanger is connected at its upper ends to the extension 66 by a pin 69 and at its lower end extends through openings 71 in the top of the bulkhead cross member 56 to catch and support the bulkhead in the event of failure of the screws 62 or any other part of the mechanism by which the bulkhead is connected to the bearings.

FIGS. 10 and 11 show still another alternative construction utilizing the same track structure as in the preceding figures and parts of which are designated by the same reference numerals. The bulkhead is of the same construction as that shown in FIGS. 4–9 with box section corner posts 72 joined by inverted channel shaped cross members 73. Rollers 74 which may be constructed in the same manner as those heretofore described ride on the tracks and are connected by a shaft 75 extending from one side of the car to the other. The shaft 75 is journaled in bearing 76 adjacent to the opposite ends thereof which bearings are bolted or otherwise rigidly connected to the vertical flange of an angle strip 77. The horizontal flange of the angle strip 77 is secured to the upper cross member 73 of the bulkhead by bolts 78 or similar fastenings. Shims may be inserted as necessary to level and position the bulkhead properly.

The rollers are normally held down on the track in this construction in the same manner as in FIGS. 8 and 9. As shown bearings 79 are mounted on the shaft adjacent to the rollers and are provided with downwardly extending arms 81. The arms 81 carry pins or rollers 82 which underlie the horizontal flange of the track strip 15 normally to prevent the rollers from leaving the track.

In order to prevent falling of the bulkhead in the event the rollers should leave the track or in the event of failure of the connections between the bearings and the bulkhead, generally C-shaped plates 83 are secured to the opposite sides of the bukhead side posts 72. As shown the plates 83 have horizontally extending lower arms 84 which overlie the sides of the bulkhead side post and are secured thereto by fastenings such as bolts 85. The plates 83 also have upper horizontally extending arms 86 which extend across the top of the vertical flange of angle strip 21 and which then extend downwardly as shown at 87 to a level below the top of the angle strip.

With this construction in the event of failure of any of the parts such as a roller leaving the track or failure of the bolts 78 or other fastening parts, the arms 86 of the plates 83 will engage the top of the angle strips 21 after the bulkhead has dropped for only a relatively short distance. Thus with this construction the bulkhead will be positively prevented from falling in the car and damaging either itself or the lading in the car.

While several embodiments of the invention have been shown and described in detail, it will be understood that these are illustrative only and are not to be taken as a definition of the scope of the invention, reference being had for this purpose to the appended claims.

What is claimed is:

1. In a lading separator of the type that includes a pair of spaced parallel tracks having elongated horizontal bearing surfaces, associated structure in the region of each track positioned only outwardly of the tracks so that the region between the spaced tracks is substantially unobstructed, support means extending between said tracks and including roller members arranged to roll over said bearing surfaces, shaft means for the roller members, two bearing structures on the shaft means spaced inwardly of the rollers, and a bulkhead positioned in the region between said spaced tracks and carried by said support means, the improvement comprising, in combination, the said associated structure providing elongated upright parallel members that extend upwardly above the horizontal bearing surfaces of the parallel tracks, extensions carried by said bearing structures on the shaft means and projecting outwardly beyond both the roller members and the tracks and being spaced from the rollers and spaced above both the tracks and the associated structures when the rollers are positioned on the bearing surfaces, the extensions including downwardly projecting portions located outwardly of and spaced from the upright parallel members and projecting below the level of the upper edge of the upright parallel members when the roller members are supported on the bearing surfaces of the tracks, so that each extension is arranged to engage associated structure to support the bulkhead in the event the rollers should slip from the tracks and the bulkhead begins to fall downwardly.

2. A device as in claim 1 including safety means carried on the support means and extending to the bulkhead to prevent the bulkhead from falling any substantial distance away from the support means in the event the connection between the bulkhead and the support means should fail.

References Cited
UNITED STATES PATENTS

| | | | |
|---|---|---|---|
| 732,666 | 6/1903 | Vickers | 49—147 |
| 1,000,807 | 8/1911 | Henry | 49—147 |
| 1,755,729 | 4/1930 | Goetz | 105—376 |
| 2,022,325 | 11/1935 | Schroeder | 105—376 |
| 2,788,990 | 4/1957 | Barcafer | 280—457 |
| 3,017,842 | 1/1962 | Nampa | 105—376 |
| 3,130,690 | 4/1964 | Johnston | 105—369 |
| 3,165,075 | 1/1965 | Miller | 105—369 |
| 3,168,055 | 2/1965 | Vander Hyde et al. | 105—376 |
| 3,227,102 | 1/1966 | Shook | 105—369 |
| 3,241,502 | 3/1966 | Magarian et al. | 105—376 |

ARTHUR L. LA POINT, *Primary Examiner.*

D. E. HOFFMAN, *Assistant Examiner.*